United States Patent [19]

Angermeier et al.

[11] Patent Number: 5,394,742
[45] Date of Patent: Mar. 7, 1995

[54] METHOD FOR RECOGNIZING ABNORMAL COMBUSTIONS IN THE CYLINDER OF AN INTERNAL-COMBUSTION ENGINE

[75] Inventors: Anton Angermeier; Manfred Wier, both of Landshut, Germany

[73] Assignee: Siemens Aktiengesellschaft, Munich, Germany

[21] Appl. No.: 66,171

[22] PCT Filed: Nov. 15, 1991

[86] PCT No.: PCT/EP91/02157
§ 371 Date: Jun. 18, 1993
§ 102(e) Date: Jun. 18, 1993

[87] PCT Pub. No.: WO92/09875
PCT Pub. Date: Jun. 11, 1992

[30] Foreign Application Priority Data
Dec. 3, 1990 [EP] European Pat. Off. ............ 90123132

[51] Int. Cl.$^6$ .......................................... G01M 15/00
[52] U.S. Cl. ................................................ 73/117.3
[58] Field of Search ................ 73/116, 117.3; 364/431.07, 431.08; 123/419, 436

[56] References Cited

U.S. PATENT DOCUMENTS

| | | | |
|---|---|---|---|
| 3,972,230 | 8/1976 | Hanson et al. | 73/116 |
| 4,697,561 | 10/1987 | Citron . | |
| 5,191,788 | 3/1993 | Nishimura | 73/117.3 |
| 5,197,325 | 3/1993 | Tamura et al. | 73/117.3 |

FOREIGN PATENT DOCUMENTS 2301691 9/1976 France .

Primary Examiner—Robert Raevis
Attorney, Agent, or Firm—Hill, Steadman & Simpson

[57] ABSTRACT

The speed for each cylinder is determined by means of two crankshaft positions z1, z2. The crankshaft positions z1, z2 are optimized in terms of the case of abnormal combustion. Abnormal combustion is recognized when, according to the selected definition of the speed difference ΔT, a limit value GW is not reached or is exceeded.

5 Claims, 2 Drawing Sheets

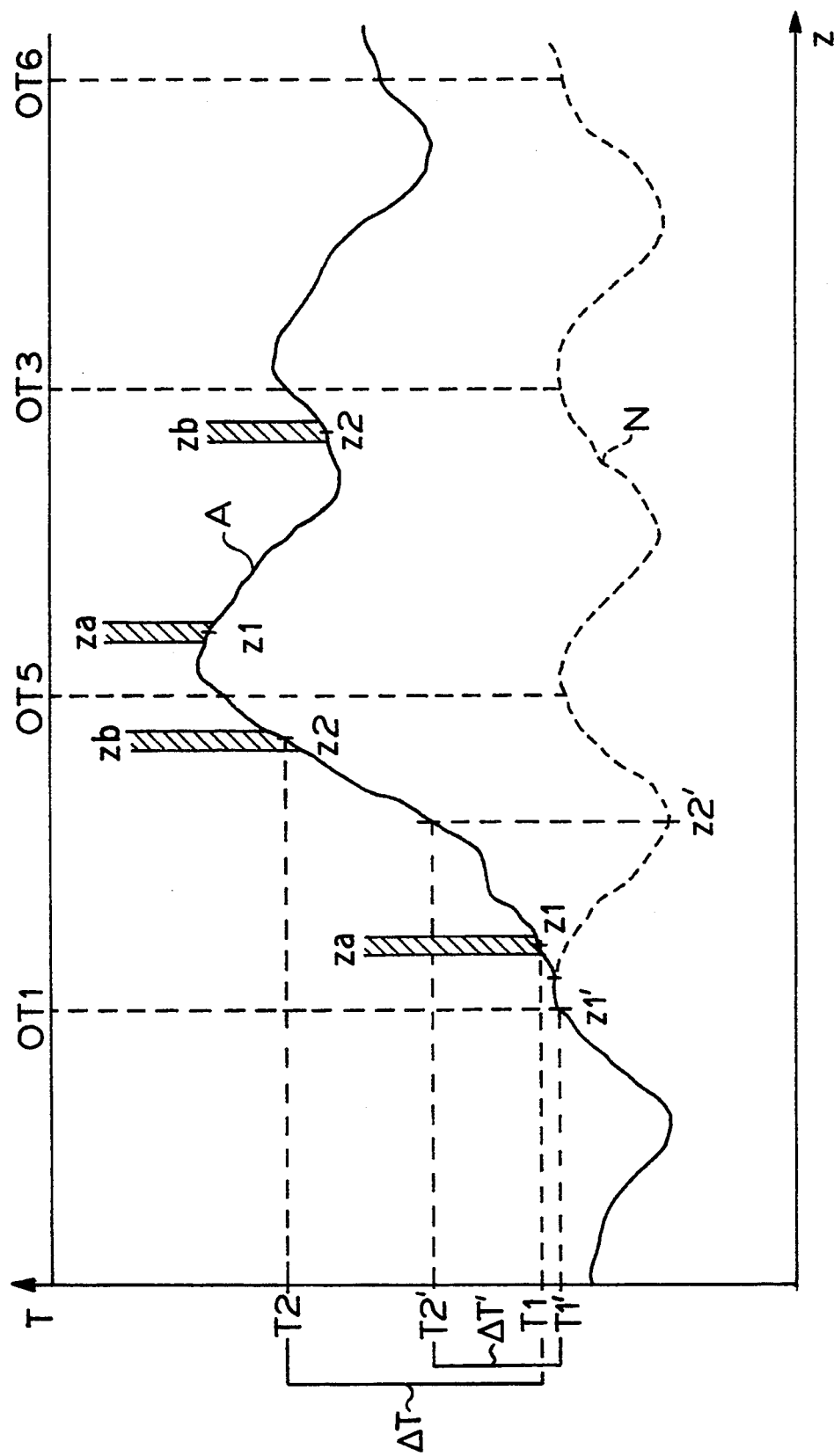

METHOD FOR RECOGNIZING ABNORMAL COMBUSTIONS IN THE CYLINDER OF AN INTERNAL-COMBUSTION ENGINE

CROSS REFERENCE TO RELATED APPLICATION

A related application is International Application PCT/EP91/02140, filed 12 Nov. 1991, and filed for entry into the U.S. national phase simultaneously herewith.

BACKGROUND OF THE INVENTION

1. Field of the Invention

The invention relates generally to a process for recognizing abnormal combustions in the cylinder of an internal-combustion engine.

2. Description of the Related Art

U.S. Pat. No. 4,697,561 discloses a method in which the speeds for each cylinder are detected, during its work cycle, by means of the crankshaft positions in which the crankshaft is at the lowest and the highest speed respectively. The difference between these two speeds is a measure of the torque generated by the cylinder. This, when related to the averaged torque of all the cylinders, gives an indication of the operating efficiency of the cylinder in question, which is utilized for diagnostic purposes.

In this method, the crankshaft positions having the lowest and the highest crankshaft speed have to be determined experimentally on the engine test bench. In particular, they are dependent on the load and on the speed and are stored in this dependence in the control unit for carrying out the method.

Corresponding tests on the engine test bench have shown that it is difficult to fix these crankshaft positions. Particularly for the purposes of the diagnosis of abnormal combustions, it has not been possible, in specific load and speed ranges, to find any crankshaft positions which would give a speed-difference signal which can be evaluated with sufficient accuracy.

SUMMARY OF THE INVENTION

The object of the present invention is, therefore, to develop the method in such a way that the evaluation capability is improved.

The solution according to the invention is achieved by determining the speed of the internal-combustion engine by means of two crankshaft positions which are selected as different depending upon load and on speed, wherein the two crankshaft positions are selected so that, in relation to the case of abnormal combustion, as great a speed difference as possible is obtained, and recognizing abnormal combustion when, according to the selected speed difference, a chronologically later minus chronologically earlier rpm value or chronologically earlier minus chronologically later rpm value, either exceeds or does not reach a limit value. Advantageous developments of the invention are include selecting the two crankshaft positions in relation to the case of a combustion misfire. The method preferably includes determining the speed for each cylinder continuously over two crankshaft-position ranges and obtaining one of the two speeds respectively from these by averaging. Simplification is provided when the limit value is zero so that whether or not the speed difference has exceed the limit value or has not reaching the limit value is recognized from the sign of the speed difference. Preferably, the crankshaft positions are selected as different in a cylinder-specific manner.

The invention proceeds from the knowledge that the problems of evaluation arise as a result of the choice of the optimization strategy for the crankshaft positions. In the state of the art, those crankshaft positions in which the crankshaft is at the lowest and the highest speed respectively are sought.

These crankshaft positions are determined during the normal operation of the internal-combustion engine, so that evidence of the torque generated by it can be derived. In the event of faults occurring to a pronounced extent in specific load and speed ranges, however, the speed difference determined in the two crankshaft positions is often no longer sufficient.

According to the invention, therefore, this speed difference increases by optimizing the crankshaft positions not in terms of normal operation, but in terms of abnormal combustion. The second crankshaft position in particular is selected at a later stage than would correspond to the point of highest crankshaft speed during normal operation.

BRIEF DESCRIPTION OF THE DRAWINGS

The invention is explained in more detail by means of the drawings. In these:

FIG. 2 shows a speed curve of the crankshaft of an internal-combustion engine to illustrate the method.

DETAILED DESCRIPTION OF THE PREFERRED EMBODIMENTS

Figure 1:
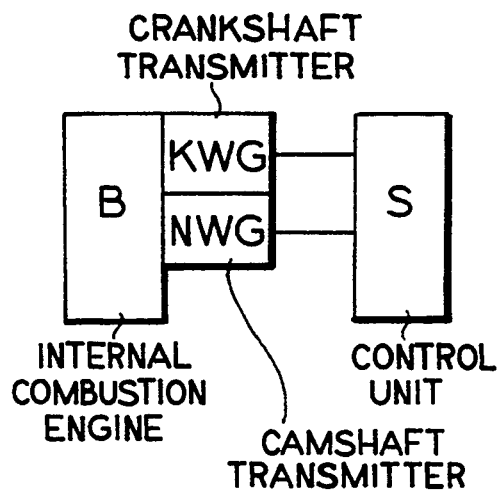
FIG. 1 shows a simplified block diagram of an arrangement for carrying out the method.

FIG. 1 shows an internal-combustion engine B with a crankshaft transmitter KWG and with a camshaft transmitter NWG. The crankshaft transmitter senses a gearwheel which is connected to the crankshaft and which has a reference mark and a plurality of teeth. The crankshaft transmitter KWG each time supplies as an output signal one pulse per tooth and one reference pulse, distinguishable from this, at the reference mark. This output signal is fed to a control unit S which, by counting the pulses, on the one hand determines the position of the crankshaft within a revolution of 360° and on the other hand determines the speed by means of the time sequence of pulses per unit time.

The camshaft transmitter NWG senses a gearwheel which is connected to the camshaft and which has a tooth over one half of its circumference and a gap over the other half of its circumference. The output signal from the camshaft transmitter NWG has two states, depending on whether the tooth or the gap is opposite the camshaft transmitter NWG. The control unit S determines the cylinder assignment and the crankshaft angle by means of this output signal together with the output signal from the crankshaft transmitter KWG. A camshaft transmitter NWG is used because, for example, on a 6-cylinder engine, there is a periodicity of two respective revolutions and therefore the position of the crankshaft alone is not yet sufficient for a clear assignment in the ignition sequence.

The control unit S has essentially the function of controlling the ignition and injection for the internal-combustion engine B and of performing various diagnostic functions. For this purpose, various sensors and actuators, which are not shown, are connected to the control unit S. Such a control unit S therefore constitutes a conventional engine control, such as is already put into practice at the present time in many vehicles.

One diagnostic function executed by the control unit S is the recognition of irregular combustions in one of the cylinders of the internal-combustion engine B. As an illustration, the reciprocal speed T of the crankshaft is plotted against the crankshaft position z in the graph of FIG. 2. The reciprocal speed was selected because a corresponding signal is already present in the control unit S. In relation to a consideration of the speed, therefore, the conditions are reversed. Consequently, a rising edge thus signifies a slowing and a falling edge an acceleration of the crankshaft. A normal curve N reproduces this trend for the normal operation of the internal-combustion engine B. The sinusoidal curve results from the various work cycles of the internal-combustion engine B, the individual acceleration phases each being located after the ignition of a cylinder during its work cycle. In FIG. 2, the top dead centers of the cylinders 1, 5, 3, 6 are shown by way of example according to the ignition sequence in a 6-cylinder engine.

The conditions which occur when proper ignition and combustion of the mixture have not taken place during the work cycle of a cylinder are shown in FIG. 2 for the cylinder 1. A misfire curve A applies when no combustion takes place at all. The crankshaft is therefore not accelerated, but is slowed further as a result of the resistances of the engine. Only after the ignition of the next following cylinder 5 with proper combustion is the crankshaft then accelerated again.

Figure 3:
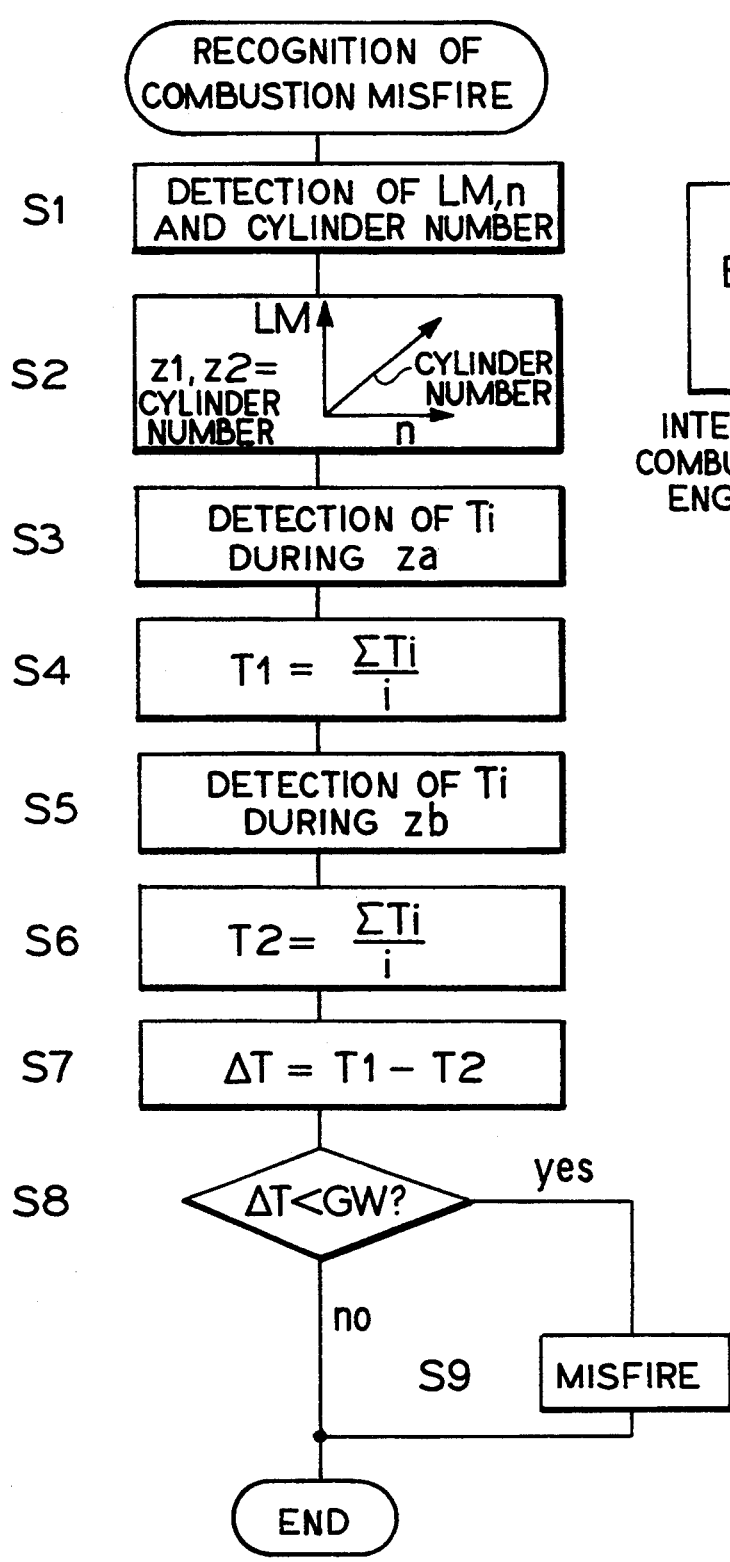
FIG. 3 shows a flow diagram for carrying out the method.

The method according to the invention for recognizing such abnormal combustions is described by means of the flow diagram of FIG. 3. A corresponding program is filed in a diagnostic routine of the control unit S and is executed continuously for each cylinder.

For this purpose, two crankshaft positions z1, z2 are fixed in relation to the respective top dead center . of a cylinder. These crankshaft positions z1, z2 are conventionally located after the top dead center, differ in dependence on load and on speed and are optimized by means of tests. It is essential, here, that the normal case according to the normal curve N is not used for the optimization, but the case of abnormal combustion, in the example the case of a combustion misfire according to the misfire curve A.

In step S1 of FIG. 3, the air mass LM, the speed n and the cylinder number of that cylinder which next reaches its top dead center are detected. These quantities are also used for the purposes of calculating the ignition time and the injection time, so that they are already present in the control unit S and can be obtained from the corresponding program routines.

In step S2, the crankshaft positions z1, z2 are then taken from corresponding families of characteristics in dependence on the air mass LM, the speed n and the cylinder number. The cylinder-specific dependence on the cylinder number is necessary in order to take into account the vibration behavior of the crankshaft.

To reduce disturbing influences, the corresponding reciprocal speeds T1, T2 are not only detected once respectively in the crankshaft positions z1 and z2, but in crankshaft-position ranges za, zb around the crankshaft positions z1, z2. Finally, the reciprocal speeds T1 and T2 corresponding to the reciprocal speeds in the two crankshaft positions z1 and z2 are obtained from the averaging of the respective reciprocal speed Ti detected thereby. This operation is carried out in steps S3, S4 and S5, S6.

In step S7, the calculation of the difference $\Delta T$ from the reciprocal speeds T1 and T2 then takes place. This difference $\Delta T$ is a direct measure of the crankshaft acceleration brought about during proper combustion.

If the difference $\Delta T$ falls below a limit value GW, therefore, there is no combustion at all or faulty combustion. If this is so, a misfire is recognized in steps S8 and S9.

In the method according to the invention, this difference $\Delta T$ is clearly greater than in the state of the art, with the result that evaluation becomes simpler and less susceptible to faults. As a comparison, FIG. 2 shows two cases for the misfiring cylinder 1. According to the invention, on the one hand the crankshaft positions z1 and z2 are optimized in terms of the misfire curve A and on the other hand the crankshaft positions z1' and z2' are shown optimized in terms of the normal curve N are shown. As the resulting differences $\Delta T$ and $\Delta T'$ indicate, a virtual doubling occurs as a result of the optimization according to the invention in terms of the misfire curve A.

The choice of the limit value GW determines the degree of abnormal combustion which will still be recognizable. An especially simple method for recognizing complete combustion misfires would be, for example, a pure sign evaluation of the difference $\Delta T$. It can be seen from the example of FIG. 2 that there is a negative difference $\Delta T$ in the case of the misfiring cylinder 1 and a positive difference $\Delta T$ in the case of the combusting cylinder 5.

For a more sensitive evaluation of even only slightly abnormal combustions, the limit value GW is set to a specific positive value. This also makes it possible to recognize as abnormal combustions which, it is true, provide acceleration contribution, but one which is insufficient in comparison with that during normal combustion. Such a faulty combustion would give a curve trend which is between the misfire curve A and the normal curve N.

Although other modifications and changes may be suggested by those skilled in the art, it is the intention of the inventors to embody within the patent warranted hereon all changes and modifications as reasonably and properly come within the scope of their contribution to the art.

We claim:

1. A method for recognizing abnormal combustions in a cylinder of an internal-combustion engine, comprising the steps of:

determining a speed of the internal-combustion engine at two crankshaft positions which are different depending upon load and on speed, said two crankshaft positions defining a speed difference of the speed of the internal combustion engine at the two positions, selecting said two crankshaft positions so that, in relation to abnormal combustion, as great a speed difference as possible is obtained, and recognizing abnormal combustion when, according to a speed difference corresponding to said two crankshaft positions selected in said selecting step, a chronologically later minus chronologically earlier rpm value or chronologically earlier minus chronologically later rpm value traverses a limit value.

2. A method as claimed in claim 1, wherein said step of selecting includes selecting said two crankshaft positions in relation to a combustion misfire.

3. A method as claimed in claim 1, further comprising the steps of:
 continuously determining a speed for each cylinder over two crankshaft-position ranges, and
 obtaining one of said two speeds respectively from said continuously determined speeds by averaging.

4. A method as claimed in claim 1, wherein said limit value is zero, and said step of recognizing is performed by determining whether said speed difference changes sign.

5. A method as claimed in claim 1, further comprising the step of:
 selecting crankshaft positions as different in a cylinder-specific manner.

* * * * *